United States Patent [19]

Longinotti

[11] 4,213,128
[45] Jul. 15, 1980

[54] METHOD FOR DECREASING THE JAMMING SUSCEPTIBILITY OF SHORT RANGE INTERROGATORS

[75] Inventor: David M. Longinotti, Brick Town, N.J.

[73] Assignee: The United States of America as represented by the Secretary of the Army, Washington, D.C.

[21] Appl. No.: 819,448

[22] Filed: Jul. 18, 1977

Related U.S. Application Data

[63] Continuation-in-part of Ser. No. 572,537, Apr. 30, 1975, abandoned.

[51] Int. Cl.² ............................................. G01S 7/36
[52] U.S. Cl. .............................. 343/6.5 R; 343/18 E
[58] Field of Search ............... 343/7 AG, 6.5 R, 18 E

[56] References Cited

U.S. PATENT DOCUMENTS

| | | | |
|---|---|---|---|
| 2,711,531 | 6/1955 | Murdock | 343/7 AG |
| 3,870,997 | 3/1975 | DiPerry | 343/18 E |
| 3,944,942 | 3/1976 | Chudleigh, Jr. | 343/7 AG |
| 4,010,469 | 3/1977 | Marcum | 343/18 E |
| 4,042,922 | 8/1977 | Natter et al. | 343/7 AG |

Primary Examiner—T. H. Tubbesing
Attorney, Agent, or Firm—Nathan Edelberg; Sheldon Kanars; Michael Zelenka

[57] ABSTRACT

A technique for decreasing the susceptibility of short range interrogators, which utilize time delay as a code means, to pulse jamming and spoofing. The technique uses information received prior to the time at which the earliest response would be expected as a measure of the jamming and spoofing density, and adjusts the sensitivity of the receiver to adapt to a high density situation.

3 Claims, 2 Drawing Figures

METHOD FOR DECREASING THE JAMMING SUSCEPTIBILITY OF SHORT RANGE INTERROGATORS

The invention described herein may be manufactured and used by or for the Government for governmental purposes without the payment of any royalties thereon or therefor.

This is a continuation-in-part of my copending application, Ser. No. 572,537, entitled "Method for Decreasing the Jamming Susceptibility of Short Range Interrogators," dated Apr. 30, 1975 and abandoned upon the filing of this application.

BACKGROUND OF THE INVENTION

The present invention relates to an anti-jamming and anti-spoofing technique for interrogation systems which utilize time delay as a code means, and more particularly, pertains to the utilization of information which measures a jamming environment. Such an interrogation system is the Mark XII system, an air defense identification system employing a long, encrypted interrogation word, consisting of a multi-pulse train, and a single pulse reply calculated from the interrogation. The Mark XII system is typified by the AN/TPX-46 and AN/TPX-50 Interrogators presently fielded by the U.S. Army. The operation of these interrogators is completely described in the United States Army Technical Manuals designated the TM 11-5895-532-34 series and the TM 11-5895-687-35 series respectively. These manuals are unclassified. The reply code in the Mark XII system is its delay from the time of receipt of interrogation. An enemy who attempts to overcome such an identification system usually does so by spoofing, that is, guessing at the appropriate reply word and time delay subsequent to the interrogation transmission, or by jamming, that is pouring out continuous replies at a great rate.

The concept of "range bins" is fundamental to the understanding of the operation of Mark XII interrogators. The range of an interrogator set may be divided into any number of equal range increments known as range bins. Since the interrogator set itself has no radar capability, ranging information is determined by measuring the time between transmitted and received signals. It is assumed the propagation speed of the signal and the retransmission time of the return signal are well known. While the interrogators may be highly mobile units, they are in a fixed position while interrogating, and therefore the spatial correspondence of each range bin to reply time remains constant.

Range zero as used herein is defined as the range of a target at the shortest range of the interrogator. Since ranging is directly related to time as described above, replies from targets at range zero are expected to arrive at the interrogator receiver some predetermined time after transmission of the interrogation code. Replies arriving at the interrogator receiver prior to range zero cannot, by definition, be associated with the interrogation signal of interest. Clearly then, although the description which follows herein utilizes the terminology "range bins prior to range zero," it will be understood that such range bins do not have associated with them a spatial position and are indicative only of the time periods prior to the arrival time of the earliest expected reply signal. Since a jammer continuously emanates jamming signals, these signals will be received over all time and will therefore fill the range bins both before and after range zero. Range zero is the range of a target at the shortest detectable range of the interrogator. Similarly, a spoofer sometimes replies sufficiently early after the interrogation to fall into a range bin prior to range zero. Friendly replies, however, will only appear after range zero. To date, range interrogators do not have anti-jamming capabilities.

SUMMARY OF THE INVENTION

The general purpose of this invention is to provide an anti-jamming technique for interrogators which utilize time delay as a code means. To attain this the present invention teaches the utilization of replies received prior to range zero to estimate the jamming and spoofing environment. This estimate of the jamming and spoofing environment is then utilized to reduce the receiver sensitivity thereby decreasing detection of jamming and spoofing signals. The technique works equally well for any number of friendly aircraft in the beam since all friendly replies appear after range zero, while only returns prior to range zero are used to adjust the sensitivity. If the power density of the friendly reply at the interrogator receiver is less than the jamming power density, there is no way to reduce jamming by reduction of the receiver sensitivity. However, since power density falls off as the inversion of the square of the distance, the required jamming power of a remote jammer must increase significantly to exceed the friendly reply at the receiver as the friendly aircraft approaches. Therefore, in most situations, the jammer's effect will be eliminated by reducing the sensitivity while the friendly replies will be received. The proposed technique especially lends itself to use with short range air defense weapon systems where the interrogator and weapon are not the preferred targets of the aircraft, and where both friendly and enemy aircraft will pass in relatively close proximity to the interrogator.

The vertical columns represent the results of sequential interrogations one through six. These columns are divided into boxes each of which represents a range bin. It should be noted there are n range bins subsequent to zero time, designated 1, 2, 3, . . . n, and 16 range bins prior to zero time, designated $-1, -2, \ldots -16$. An "X" in a range bin indicates a reply received in that range bin. The receiver sensitivity for each interrogation is indicated beneath each column. "S" indicates the receiver sensitivity for the initial interrogation. For purposes of this discussion the sensitivities during the second through fifth interrogations are reduced incrementally by 3db, during the sixth interrogation the receiver sensitivity is the same as during the fifth interrogation.

Figure 2:
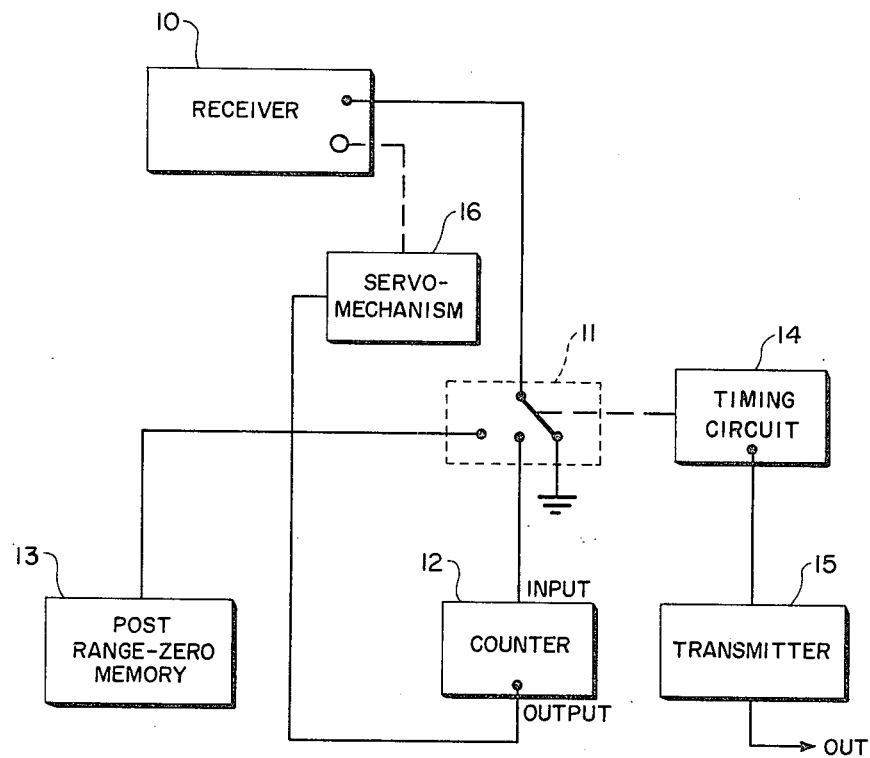

FIG. 2 is a block diagram of one embodiment of an apparatus for implementing the claimed technique.

DESCRIPTION OF THE PREFERRED EMBODIMENT

Figure 1:
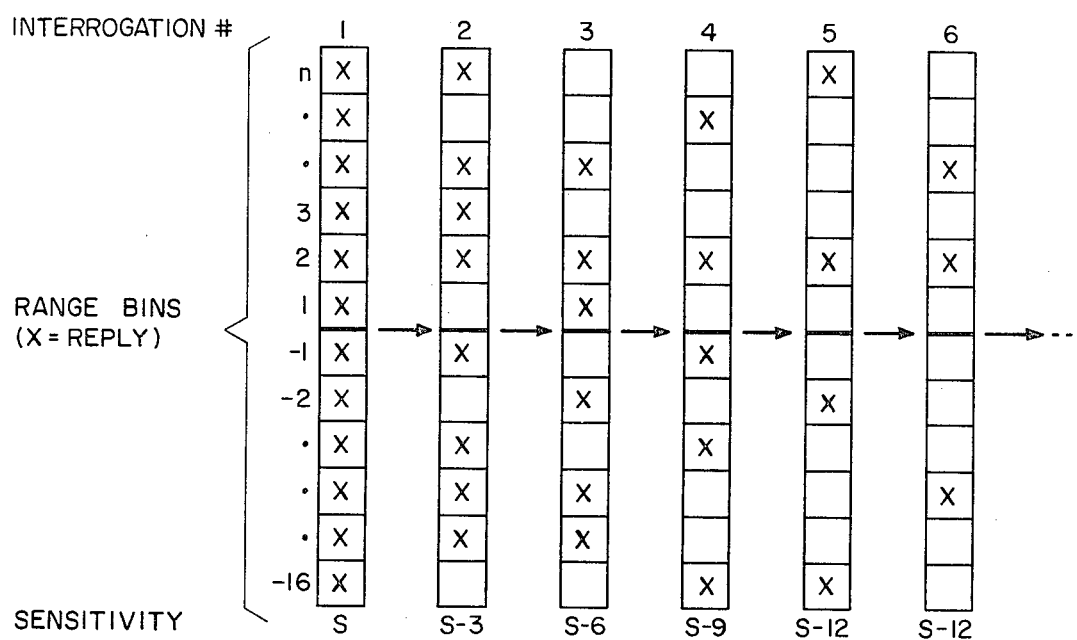
FIG. 1 is a graphic representation of a jamming situation which could be corrected by the use of this technique.

The method for decreasing susceptibility of short range Mark XII type interrogators to pulse jamming and spoofing may be implemented as follows. The first interrogation is made with the receiver set at its predetermined normal operating sensitivity. All replies received in a time period corresponding to sixteen range bins prior to range zero are counted. These replies can only be due to spoofing, jamming, and fruit, that is, asynchronous friendly replies. If the number of replies received in the time period corresponding to sixteen range bins prior to zero time exceeds the number of asynchronous friendly replies expected with a given reply reliability in a benign environment, the receiver sensitivity is lowered by 3db and the aircraft is again interrogated. This method is continued through subsequent interrogations until the number of replies received in the period corresponding to sixteen range bins prior to range zero is less than or equal to the number of asynchronous friendly replies expected with a given reply reliability in a benign environment. So long as this condition prevails, the replies received after range zero may be considered valid, and subsequent interrogations are made with the same receiver sensitivity. After a friend-foe determination has been made, the receiver may be returned to its normal operating sensitivity, or it may be retained at its less sensitive adjustment until the operator has reason to believe the jamming and spoofing environment has changed. In the illustration in FIG. 1, assume the expected number of asynchronous friendly replies prior to range zero is two. All range bins for the first interrogation are shown filled with replies due to jamming, spoofing and fruit. For the second interrogation, the receiver sensitivity has been lowered by 3db. As a result some jamming, spoofing, and fruit are no longer detected, but not enough have been removed to make a friend-foe decision. A similar situation exists for the third and fourth interrogation. On the fifth interrogation the number of replies prior to zero range has dropped to the expected amount or fewer and therefore, the sensitivity has been lowered sufficiently to prevent detection of enough of the jamming, spoofing, and fruit, so that a friend-foe decision can be made. The remainder of the interrogations are made with the same adjusted sensitivity level and the friend is shown in the second range bin. It should be noted that in the general application of this invention no significance is attached to the use of sixteen range bins prior to range zero. The number of range bins selected prior to range zero will be dependent on the required certainty of friend identification. Further, while the technique may be implemented manually, that is, the operator may compare the count of replies received prior to range zero with a predetermined number and manually reduce the receiver sensitivity if necessary, it easily lends itself to electronic implementation by well-known techniques. For example, an apparatus of the type illustrated in block diagram form in FIG. 2 may be utilized. FIG. 2 illustrates a receiver 10, the output of which is coupled through a switch 11 to either ground, a counter/comparator 12, or a post-range-zero memory 13 dependent on the output of a timing circuit 14 which also controls the transmitter 15. The time at which the timing circuit 14 activates the switch 11 or the transmitter 15 is dependent upon the size of each range bin, the minimum range of the interrogator, and the number of range bins it is desirable to examine prior to range zero. In the usual case, the timing circuit 14 will activate switch 11 prior to transmission of the interrogation signal. It should be noted the two preceding sentences relate to design criteria. The size of each range bin is generally fixed by the interrogator design, and, as is well known in the prior art, relates directly to its resolution capabilities with respect to differentiating aircraft at nearly the same range. As may be gleaned from the foregoing, the timing of the circuitry proposed to implement the method of the invention is affected by the size of the range bins once one settles on the number of range bins to be examined prior to range zero, since as the range bins increase in size, so does the time required to examine a given number. The minimum range of the interrogator is also generally fixed by the interrogator design. It is important for the implementation of the invention because it provides information as to when the first valid replies are to be expected after the time of transmission. Replies received prior to this time may be used as a measure of the jamming environment as described in the specification. The number of range bins examined prior to range zero will be dependent upon the required certainty of friend identification. As a general rule, the more range bins examined prior to range zero in order to determine the jamming environment, the more certain will be friend identification. This generalization, of course, does not hold true when the jamming environment is widely fluctuating since the average jamming environment will not be indicative of the instantaneous jamming environment.

FIG. 2 shows the switch 11 initially in a position such that the output of the receiver 10 is channeled to ground. At the proper time as determined by the above criteria the timing circuit 14 activates the switch 11 such that the receiver output is coupled to a counter/comparator 12 wherein receiver replies in the sixteen range bins prior to range zero are normalized, counted and compared to a predetermined count (the number of asynchronous friendly replies expected in a benign environment). If the received replies exceed the predetermined count an adjustment signal is forwarded to the servo mechanism 16 which decreases receiver sensitivity. The constituents of the counter/comparator 12, post range-zero memory 13 and timing circuit 14 are all well known in the prior art.

Counter/comparator 12 need be nothing more than a voltage source, integrator, potentiometer and Schmidt trigger. The integrator should be coupled to the receiver through appropriate buffer circuitry. If the charge across the integrating capacitor exceeds a predetermined level, which level is established by a voltage source and potentiometer, it is used to actuate a Schmidt trigger. The output of the Schmidt trigger is coupled to a servo mechanism which incrementally lowers the receiver sensitivity. Design information related to the requisite circuits may be found in *Analysis and Design of Electronic Circuits* referenced infra.

A typical Post Range-Zero Memory 13 is that described on page 5-1 of U.S. Army Technical Manual TM 11-5895-687-35-2 for D.S. G.S. and depot repair of Interrogator Set AN/TPX-50 (Signal Processor CP-936/TPX-50) dated August 1971.

Timing circuit 14 may be of the type which utilizes an oscillator coupled to a binary counter, the output of which is decoded and used to control the position of switch 11. Information concerning oscillators suitable for this application may be found on Pages 448–467 of *Analysis and Design of Electronic Circuits* by P. M. Chirlian published by McGraw Hill and copyrighted in 1965. Suitable digital logic circuitry may be found on page 41 of the *Digital Logic Handbook* distributed by Digital Equipment Corporation of Maynard, Massachusetts, and copyrighted in 1967. Subsequent to range zero the timing circuit 14 actuates the switch 11 so that replies are channeled to the post range-zero memory 13 where they are stored for friend-foe decision purposes in a manner well known in the prior art and exemplified by the AN/TPX-46 and AN/TPX-50 equipments. Between successive interrogations, during the time period starting subsequent to the maximum range of the interrogator and ending prior to the first of the sixteen range bins prior to range zero, the timing circuit 14 actuates the switch 11 to route receiver 10 replies to ground.

As noted previously, the method of the claims may be implemented manually to a large degree. The switching, timing, and sensitivity control functions may all be performed by an operator without the assistance of any apparatus other than a simple switch and a receiver with variable gain. Only the counting/comparison function requires the use of elecronic circuitry.

An automatic or manual reset feature may be provided for returning the receiver sensitivity to its normal value either incrementally or directly.

What is claimed is:

1. A method for decreasing the susceptibility of short range interrogators of the types which utilizes the delay time of the reply pulse as a code means to pulse jamming and spoofing comprising:
   sampling the jamming and spoofing environment by counting replies received prior to range zero for each interrogation;
   comparing the number of replies received prior to range zero to an acceptable reference number for each interrogation;
   reducing the receiver sensitivity when the comparison indicates a number of replies received prior to range zero greater than said referenced number.

2. The method of claim 1 wherein the sampling, comparing and reducing are repeated until the number of replies received prior to range zero is less than or equal to said acceptable reference number.

3. The method of claim 2 wherein the receiver sensitivity is returned to a higher level subsequent to a friend-foe decision.

* * * * *